Dec. 20, 1966   G. W. STILLEY ETAL   3,293,021
METHOD OF HEATING GLASS SHEETS
Filed June 6, 1963   4 Sheets-Sheet 1
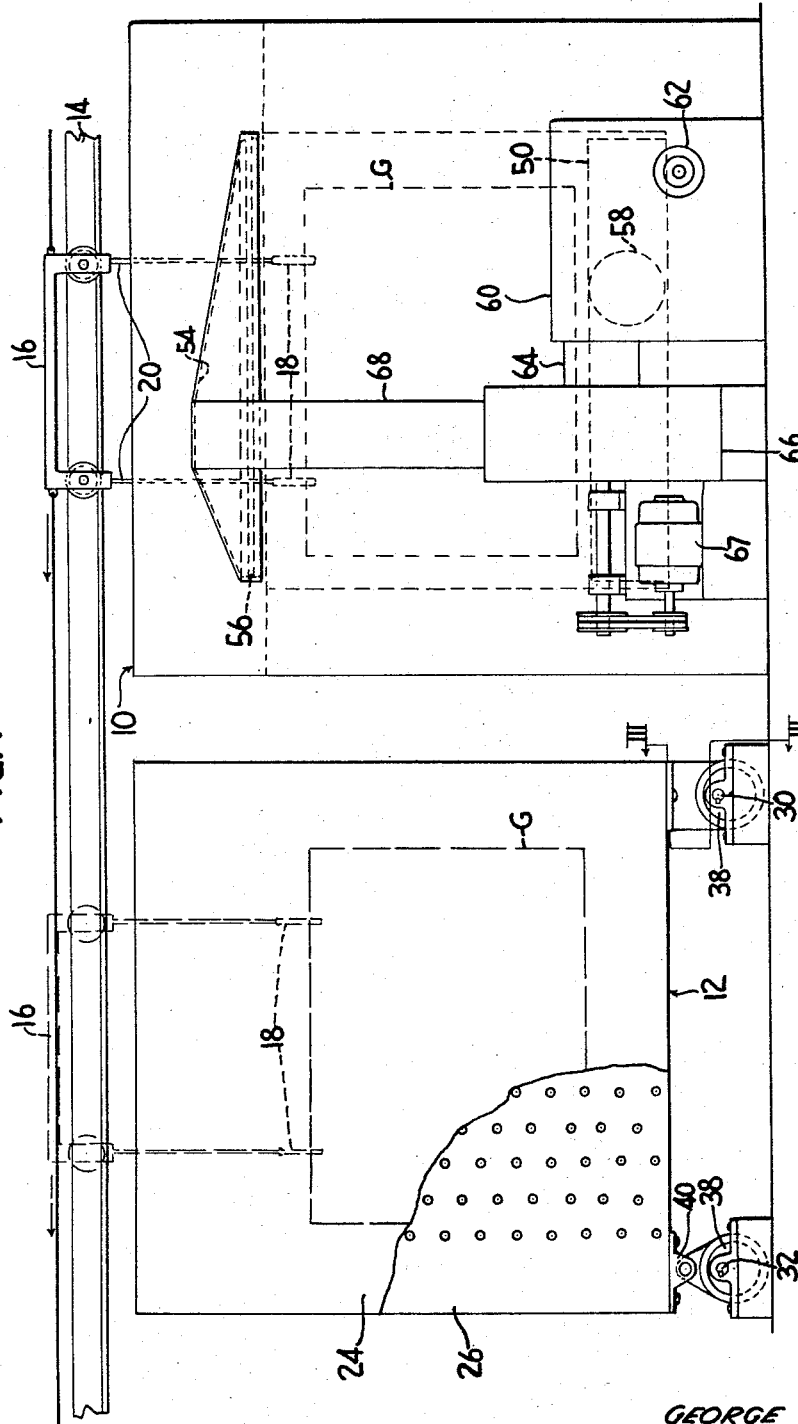
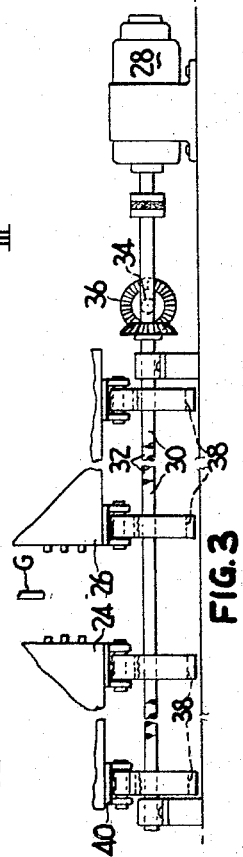
INVENTORS
GEORGE W. STILLEY and
HAROLD E. McKELVEY
BY
Oscar L. Spencer
ATTORNEY Dec. 20, 1966  G. W. STILLEY ETAL  3,293,021
METHOD OF HEATING GLASS SHEETS
Filed June 6, 1963  4 Sheets-Sheet 2
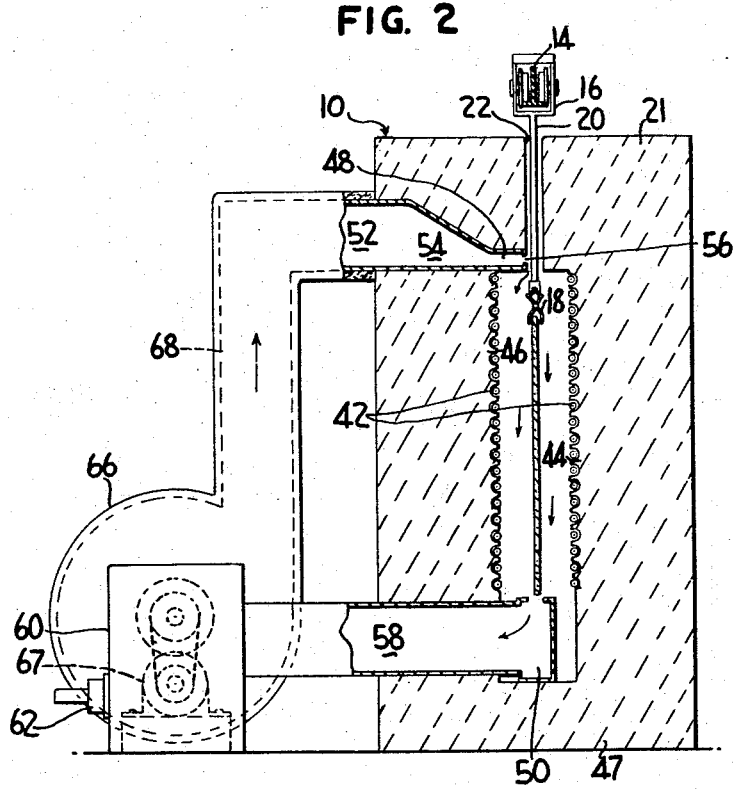
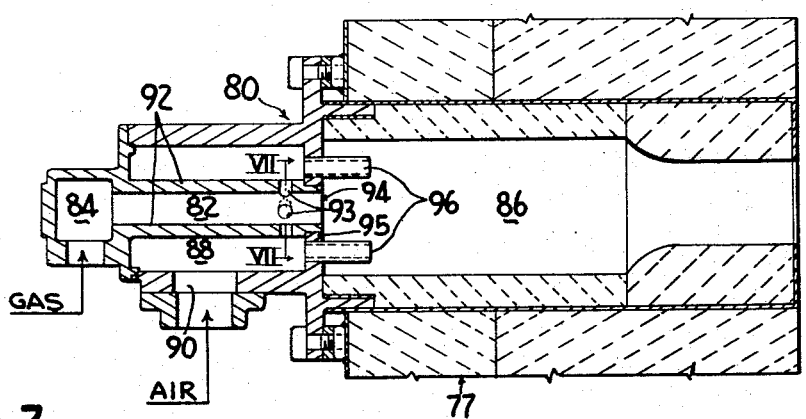
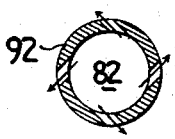
INVENTORS
GEORGE W. STILLEY and
HAROLD E. McKELVEY
BY
Oscar L. Spencer
ATTORNEY

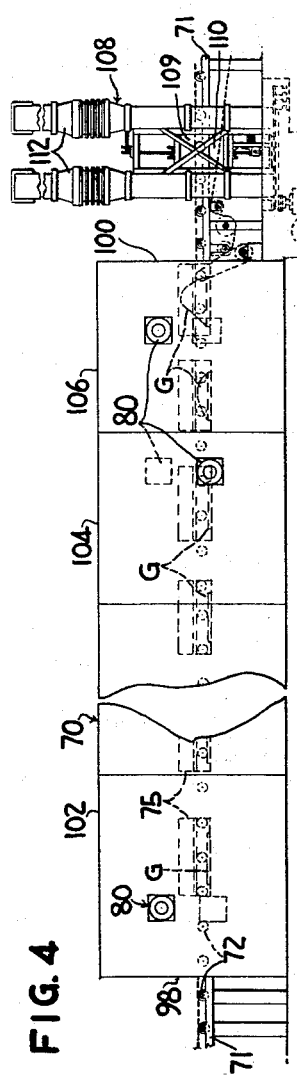
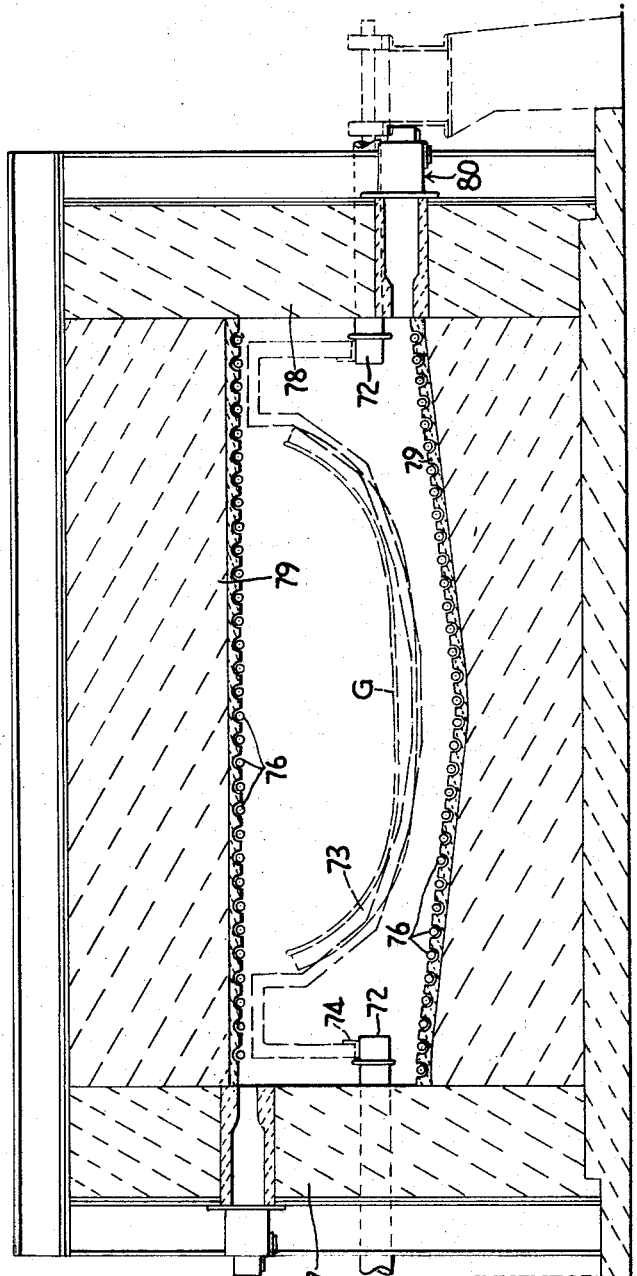

Dec. 20, 1966  G. W. STILLEY ETAL  3,293,021
METHOD OF HEATING GLASS SHEETS

Filed June 6, 1963  4 Sheets-Sheet 4

INVENTORS
GEORGE W. STILLEY and
HAROLD E. McKELVEY
BY
Oscar L Spencer
ATTORNEY

United States Patent Office 3,293,021
Patented Dec. 20, 1966

3,293,021
METHOD OF HEATING GLASS SHEETS
George W. Stilley, Freeport, and Harold E. McKelvey, New Kensington, Pa., assignors to Pittsburgh Plate Glass Company, Pittsburgh, Pa., a corporation of Pennsylvania
Filed June 6, 1963, Ser. No. 286,059
6 Claims. (Cl. 65—111)

This invention relates to the fabrication of glass and more particularly to the heating of glass sheets, especially preparatory to other operations such as tempering, bending, coating, and annealing such sheets. In each type of operation for which the present invention is adapted, it is necessary that the glass sheet be at an elevated temperature for at least a portion of the treatment cycle.

Glass sheets are fabricated through many known manufacturing techniques, such as bending, tempering, annealing, coating, and combinations of such techniques to form end products having characteristics and uses different from the original product. A common feature of these techniques is the heating of glass sheets to a temperature above that at which the major surfaces of the contour thereof is susceptible to be changed by a deforming stress or contact with a solid member, hereinafter referred to as the deformation temperature. The deformation temperature is above a temperature known as the strain point and below a temperature known as the softening point.

The softening point has been defined as that condition in which glass has a viscosity of $10^{7.6}$ poises; the annealing point as that condition in which glass has a viscosity of $10^{13.4}$ poises; and the strain point as that condition in which glass has a viscosity of $10^{14.6}$ poises. The expressions "softening temperature," "annealing temperature," and "strain temperature" are the temperatures at which glass attains the viscous conditions above and are also known as the "softening point," "annealing point," and "strain point," respectively. For ordinary soda-lime-silica plate glass, the "strain point" is about 960 degrees Fahrenheit, the "annealing point" is about 1015 degrees Fahrenheit, and the "softening point" is about 1350 degrees Fahrenheit.

Glass is tempered in order to place the surface layers in a permanent condition of compressive stress while the protected interior develops a tension stress to compensate for the compressive stress of the surface layers. Glass so tempered is more resistant to breakage caused by impact, abrasion, bending, and thermal shock than annealed glass which does not have its surface strengthened by a state of high compression.

Traditionally, glass has been tempered by exposure to radiant energy in order to heat the glass to a temperature approaching its softening point and then suddenly chilling the heated glass either by prolonged application of air blasts or by quenching in a bath of a liquid having high thermal capacity to remove the heat retained in the article at a relatively fast initial rate which gradually diminishes.

When glass is annealed, its temperature is raised above both the strain point and the annealing point and the glass is cooled in a controlled manner. Glass sheets must be raised in temperature above these points to shape the glass, to fuse a frit coating thereon or to form a metal oxide coating by applying a filming composition containing a metal salt or organic metal compound which hydrolizes upon contact with the hot glass. In each case, the surface is likely to be soft enough to deform by virtue of its being supported by solid members which contact the glass during its heating.

In the past, economic utilization of fabricating equipment has required that the glass sheets undergo treatment while hot. The necessity of conveying the glass sheets at high temperatures has heretofore resulted in undesirable deformation or marring of the major surface of glass sheets being treated due to physical contact with solid members which comprise supporting and conveying apparatus which contact the glass at elevated temperatures.

Known processes of increasing the strength of glass sheets involve exposing the glass to radiant heat and subsequently uniformly quenching the surface of the glass sheet. The most frequently used processes involve supporting the treated glass sheet in a vertical plane or in a horizontal plane.

Glass sheets are supported in a vertical plane by tongs which grip the sheets near their upper edge or by resting the bottom edge of a glass sheet on a mesh support carried by a conveyor. In the latter case, the glass sheet is held upright by fingers extending downward along each side of the upper edge of the glass. Such vertical processes leave tong marks or finger marks on the glass.

Glass is also supported for heating by being conveyed in a horizontal disposition over a series of spaced conveyor rolls through a heating furnace. Such roller process leaves roller marks, scuff marks, and other defects, in addition to which a certain degree of "wave" distortion is inevitably imparted to the sheet as a consequence of the glass undulating over the spaced rolls as it softens in its travel.

The above problems apply also to the handling of glass sheets for other fabrication purposes requiring heating the glass to elevated temperatures. These include shaping or bending, annealing and coating or filming.

When glass is simultaneously bent and tempered, the glass may be supported or suspended by tongs, heated above its deformation temperature and subjected to bending moments by application of weighted wires urging the glass to conform to a predetermined simple curve or by application of complementary male and female solid molding members capable of shaping the heat-softened glass to more complicated shapes. The tongs mar the glass when they engage the surface, as do wires or solid portions of the pressing members. This surface marring is worse when contact occurs at higher glass surface temperature than at lower glass surface temperature.

Horizontal bending by gravity has been utilized to bend a sheet while it is being heated preparatory to its tempering operation. Sheets of glass are mounted on a mold of outline configuration in which only a thin section of the major surface around the periphery of the glass being bent comes into contact with the outline mold surface. The glass is allowed to sag to conform to the shape of the mold shaping surface under the influence of heat sometimes aided by moments of force applied through movable mold sections. The central portion of the glass sheet has a tendency to sag uncontrollably because it must of necessity be heated to the deformation temperature in order to have its core sufficiently hot for tempering. Under such circumstances, the unsupported portion of the glass intermediate its supported side edges cannot resist deformation.

Radiant heaters are conventionally employed to heat glass sheets to temperatures approaching the softening point of glass, which is necessary for most of the operations described above. Such heaters irradiate the glass at an energy level at which glass is partly transparent and partly absorptive of radiant energy. Therefore, a large portion of the radiant energy irradiated onto commercial plate or sheet glass must have a wave length in the wave band between about 2.5 microns and about 4 microns in order to insure that the glass absorbs the incident radiant energy throughout its depth.

Conventional radiant heaters comprise gas burners or electric resistance wires acting as heating elements uniformly spaced and supported in refractory walls. Optimum average wall temperature is more than 1400 degrees Fahrenheit.

The heating elements are preferably energized to a temperature sufficiently above that of the walls to insure an average wall temperature of 1400 degrees Fahrenheit. A heating element temperature of at least 1600 degrees Fahrenheit is needed to raise the refractory wall temperature to the desired radiant level.

However, a substantial portion of heat irradiated onto the glass sheets is absorbed at its surface. This is because the heat irradiated onto the glass has a wave length distribution very similar to that of a black body and the radiant heat includes wave lengths at which commercial plate or sheet glass is a good absorber and a poor transmitter or conductor. Therefore, the glass surfaces absorb these wave lengths and tend to become hotter than the interior. At sufficiently high temperatures the glass surfaces become susceptible to deformation on contact with a solid member before the interior of the glass is sufficiently hot to enable the glass to be shaped, tempered or annealed, etc.

It is also necessary to avoid damage from "chill-cracking" duration heating. The latter phenomenon occurs in the glass surface when the temperature gradient between one locality of the glass surface and an adjacent locality or its interior is sufficiently great to cause tension stress in the glass surface locality sufficient to fracture the glass sheet spontaneously before the temperature of the locality stressed in tension reaches the annealing point. Chill-cracking or glass fracture is extremely likely to happen in the localized portion of the glass in contact with a solid glass support member. The latter, usually of stainless steel, is usually colder than the glass before the latter is heated to its annealing range and may frequently cause the contacted glass portion to be below the annealing range when another portion has been heated to above the annealing range, thereby establishing a tension stress condition in the contacted locality that results in chill-cracking.

The present invention provides a novel treatment of the glass sheet during its radiant heating incidental to a fabrication treatment of the glass which reduces considerably the tendency of the glass surfaces to be marred by supporting elements. The present invention also reduces considerably the tendency of the glass to sag uncontrollably in the unsupported regions in those instances wherein the glass is bent by gravity sagging to an outline shaping surface while supported horizontally. The present invention also minimizes "wave" in glass conveyed on spaced rolls during heating. Another benefit of the present invention is considerable reduction in glass fracture or losses due to chill cracking during fabrication.

The present invention accomplishes these results by simultaneously exposing the glass surfaces and the solid glass contacting members to currents of fluid moving along the surfaces while radiating sufficient heat from radiant heat sources facing at least one and preferably both of the glass sheet major surfaces onto the glass sheet to raise the interior temperature of the glass to above its annealing point and approaching its softening point. In the preferred embodiment of the present invention, gas heated substantially above room temperature and below the glass softening point is applied over the entire major surfaces of the glass sheet at a rate sufficient to break up a layer of stagnant air that usually is present at the glass surface when the glass is subjected to radiant heating. The exact rate of flow could not be measured at the glass surface, but the rates of supplying fluid for different environments is mentioned in the specific examples which follow to serve as a guide for acceptable operations.

This simultaneous application of a convection current according to the present invention moderates the temperature rise at the glass surfaces, first by accelerating and later by decelerating the surface heating rate, to a greater extent than it affects the rate of temperature rise within the body of the glass sheet. The surface layers of the glass sheets treated according to the present invention are harder than those of glass sheets treated according to conventional prior art techniques, thereby enabling the glass surfaces to resist deformation to a greater extent than workpieces treated by the prior art techniques.

In addition, the relatively hot interior of the glass is free to flow and enable the glass to assume a tempered condition upon its sudden chilling following the heating operation or to assume the shape desired by press bending or gravity sagging with minimum harm to the surface.

Another benefit of the flowing of fluid is to moderate the temperature of the members which support and which contact the glass sheets undergoing heat treatment. The fluid flow causes the temperature of the glass contacting members to be more nearly equal to that of the treated glass by virtue of the fact that the fluid flow causes more heat transfer between the glass and the glass contacting members than is the case when no fluid flow is present.

In cases where the glass undergoes a coating operation, the interior of the glass serves as a reservoir of heat that helps heat the glass surface to its filming temperature for an interval sufficiently long to produce a film or coating. The reservoir of heat enables a relatively cold metal salt composition sprayed or otherwise applied to the heated glass sheet to form a film containing metal oxide after the latter leaves the furnace and before its surface temperature cools to below a temperature at which the film forms.

In a typical operation utilizing flat glass sheets gripped by tongs, rejects were reduced to less than half of what they were utilizing a previously employed technique which omitted convection currents of gas.

Illustrative embodiments of apparatus capable of performing the present invention will be described.

In the drawings, wherein like reference numerals refer to like structural elements, FIG. 1 is a longitudinal elevation of a so-called vertical heating furnace capable of performing the present invention shown in conjunction with tempering apparatus;

FIG. 2 is a partial cross section and partial end elevation of the furnace portion of the apparatus of FIG. 1 showing the installation of a gaseous supply system in an electric heating furnace;

FIG. 3 is a fragmentary sectional view along the lines III—III of FIG. 1 showing a drive mechanism for operating the tempering apparatus to provide orbital movement relative to glass sheets undergoing sudden chilling;

FIG. 4 is a fragmentary, partly schematic, longitudinal elevation partly in section of an alternate embodiment of a furnace employing the present invention wherein glass sheets are supported in a substantially horizontal disposition for thermal treatment incidental to bending and tempering;

FIG. 5 is a cross-sectional view of the furnace of FIG. 4;

FIG. 6 is an enlarged sectional view of a high velocity gas burner of the type employed to produce rapid currents of hot gaseous flow according to the present invention;

FIG. 7 is a detailed sectional view along the lines VII—VII of FIG. 6;

Figure 8:
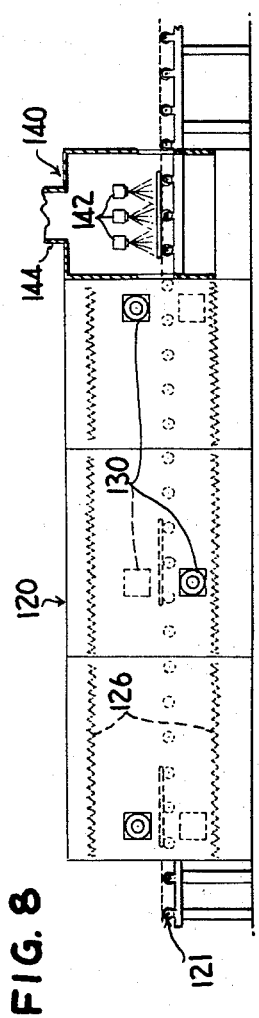
FIG. 8 is a longitudinal view of a roller hearth furnace using the present invention to prepare glass sheets for coating.

Referring to the drawings, FIG. 1 shows a tunnel-like heating furnace 10 in end-to-end relation with a tempering apparatus 12. A monorail 14 extends along a horizontal path above the roof of the furnace and the tempering apparatus for conveying cars 16 from which are suspended tongs 18. The latter are attached at the bottom of vertical rods 20 which attach the tongs 18 to the cars 16.

The upper wall 21 of the furnace is provided with a thin longitudinal slot 22 along its entire length to permit clearance for the tong supporting rods 20. Thus, the tongs 18 and glass sheets gripped thereby are able to traverse the furnace 10 when the cars 16 move along the monorail 14. Thus, the monorail 14 is located in a vertical plane containing a path of movement of the glass sheets through the furnace 10 and the tempering apparatus 12.

Beyond the furnace 10 is the tempering apparatus 12 comprising a pair of nozzle boxes or plenum chambers 24 and 26 disposed on opposite sides of the vertical plane occupied by the monorail 14. Nozzle boxes 24 and 26 are each provided with a set of nozzles that extend toward one another through the inner walls of the plenum chambers and are connected to a suitable source of air under pressure to a compressor (not shown).

A motor 28 directly drives a drive rod 30. The latter drives a driven rod 32 through a connecting rod 34 which engages rods 30 and 32 through bevel gearing 36 at its ends. Each rod 30 and 32 has eccentrics 38 mounted thereon. The eccentrics 38 are pivotally connected to a bracket 40 at the bottom of each nozzle box 24 and 26. The above structure maintains a fixed spacing between the opposed plenum chambers while actuating their movement in unison in spaced orbital paths to quench a heated glass sheet supported therebetween in a manner well known in the art.

The furnace is provided with a series of electrical heaters 42 supported along the inner side walls 44 and 46 thereof (FIG. 2). A bottom wall 47 supports side walls 44 and 46 and forms the bottom of the furnace 20.

Side wall 46 is apertured along its length to provide a top passage 48 and a bottom passage 50. The top passage 48 communicates with an inlet conduit 52 at a chamber 54 which tapers in height from the inlet conduit 52 toward the center of the tunnel-like furnace in a direction transverse to the axis of monorail conveyor 14. The chamber 54 also tapers in height forwardly and rearwardly along the length of the furnace 10 from its connection with the inlet conduit 52. The top passage 48 terminates in a narrow, horizontally disposed slot 56.

The bottom passage 50 communicates with an outlet passage 58 that leads into a combustion chamber or fluid heating means 60. The latter is provided with a gas burner 62 containing the usual air inlet, gas inlet, mixing chamber, pilot and main valves, which are not shown because the specific construction thereof is not a part of the present invention and many commercially available gas burners are suitable for use with the apparatus described in this portion of the description.

A duct 64 extends between the combustion chamber 60 and a fan housing 66. The latter contains a fan driven by a fan operating motor 67. An outlet duct 68 communicates between the fan housing 66 and the inlet conduit 52. When the fan in the fan housing 66 is operated, convection currents of a mixture of combustion products from the combustion chamber 60 are circulated in the direction of the arrows shown in FIG. 2. An identical blowing system (not shown) may be located on the opposite side of the furnace from the one illustrated to insure equal and opposite flows of fluid down the opposite major surfaces of the treated glass sheets.

The inlet conduit 52, duct 64 and the outlet duct 68 are all covered with a blanket of thermal insulation. This improves the thermal efficiency of the fluid delivery system by reducing the heat loss of the moving gas.

The gas fired recirculating system hereinabove described provides a downward flow of fluid along the major surfaces of the glass sheet suspended vertically within the furnace 10. This minimizes stratification of air in the furnace, avoids the establishment of a hot layer of stagnant air at the glass surface and reduces the likelihood of local variations in temperature.

The recirculating fluid, which is a mixture of combustion products and excess air, is forced into the top of the furnace and is withdrawn from the bottom of the furnace. The positive gaseous flow through the circulating system provides an atmosphere within the furnace slightly above atmospheric pressure.

This superatmospheric pressure within the furnace reduces the likelihood of the entry of random cold air currents into localized portions of the furnace. Also, the positive pressure within the furnace forms somewhat of a barrier to the entry of cold air from the tempering apparatus to the furnace.

Prior to the installation of the recirculating fluid supply system, a survey of the glass temperature within the furnace showed that the temperature of the glass sheet heated for tempering in the furnace varied from sheet to sheet by as much as 40 degrees Fahrenheit. In addition, temperature differentials of as much as 40 degrees Fahrenheit were experienced between different portions of a glass sheet conveyed through the furnace. Thus, flat glass sheets were warped during the furnace heating step. Some sheets were bent into compound shapes with sharp kinks along the unsupported edges quite prevalent.

Considerable breakage was experienced, particularly with larger sizes of glass. This is believed attributable to the thermal stresses established between the different portions of the glass sheet caused by uneven heating of the entire sheet aggravated by localized cooling due to random currents of cool air against one or more localized portions of the sheet.

The particular furnace in which the recirculating system was installed was capable of handling glass sizes up to 72 inches by 108 inches. The furnace was provided with electrical heating elements of 383.5 kilowatts capacity uniformly distributed over an area of 131 square feet.

The temperature of the gas supplied through the recirculating system in a downward movement along the vertical surfaces of the glass was kept below the temperature of the glass when the latter was withdrawn from the furnace by supplying 730 cubic feet per hour of gas and 8300 cubic feet of air to the gas burner. The furnace had a volume of 63 cubic feet and the fan a capacity of supplying a pressure equal to 9½ inches of water column at the rate of 3800 cubic feet per minute. Since the fluid was removed at the rate of 2800 cubic feet per minute into the combustion chamber, the furnace operated with a positive pressure equal to about 0.2 inch of water column. The excess gas escaped through vents in the furnace and through the entrance and exit openings when doors normally covering the openings were opened to permit the entry of a glass sheet or the removal of a heated glass sheet.

Experiments were performed employing recirculated fluids reheated to temperatures as high as 1250 degrees Fahrenheit. However, the upper temperatures of the range explored were unsatisfactory because the glass was too soft at such temperatures and the tongs penetrated too deeply into the glass to produce an acceptable product. When the air-to-gas ratio was increased by supplying 400 cubic feet per hour of gas and 7000 cubic feet per hour of air, the gaseous products were introduced at 1120 degrees Fahrenheit. The temperature exceeded the initial glass surface temperature and was below the ultimate glass surface temperature.

The best results were obtained in the particular furnace utilizing the air-gas mixture described previously with an electrical system of heating elements provided 383.5 kilowatts over 131 square feet of wall space.

Since the gaseous products were circulated in a downward direction throughout the entire length of the furnace initially, the recirculating gas accelerated the heating of the glass sheet surfaces during the early part of the heating cycle. Only after the glass had been heated to approximately the temperature of the recirculating gas did the retardation of the surface heating rate take place.

In the apparatus disclosed hereinabove, the surface temperature of the glass sheet without convection currents across the glass sheet surface was 1220 degrees Fahrenheit. After the introduction of recirculating gaseous currents at a temperature of 1120 degrees Fahrenheit, the surface temperature of the glass sheets at the end of the heating cycle averaged 1170 degrees Fahrenheit. The interior or core temperature of the glass sheets in both instances was sufficient for tempering.

The recirculating system has increased the rate of production by 20 percent and has decreased the rate of rejects by about 60 percent in the furnace depicted in FIGS. 1 to 3.

FIGS. 4 through 7 disclose another embodiment utilizing fluid flow to moderate the surface temperature of a glass sheet supported horizontally during bending and tempering. In this second embodiment, a horizontally disposed furnace 70 is shown with a support structure 71 for a series of conveyor rolls 72. The conveyor 72 transports sectionalized outline molds 73 by providing rolling support of sled-like rails 74 of conventional mold supporting carriages 75. The furnace is provided with electrical heating elements 76 disposed to radiate heat toward a plane of support for the glass sheet movement that is substantially parallel to the left side wall 77 and the right side wall 78 of the furnace 70. Heating elements 76 are mounted in the upper and lower walls 79 of the furnace.

The voltage to each electrical heating element is controlled as depicted in U.S. Patent No. 3,068,672. The electric heating elements provide a series of consecutive radiant heating patterns along the length of the conveyor 72 for heating the glass sheets and cause them to sag into conformity with the shaping surface of the moving bending molds 73.

Gas burners 80 are supported in openings in the left wall 77 and in the right wall 78 looking along the direction shown in FIG. 5. The gas burners 80 are arranged in pairs with one of the pairs disposed through wall 77 being laterally opposite but vertically offset with respect to the other burner of the pair.

In the section shown in FIG. 5 the burner extending through the left wall 77 is disposed to apply at a high velocity toward the right wall 78 an air-gas mixture containing an excess of air and heated combustion products at a level above the top surface of the glass sheet supported for bending whereas the gas burner facing inward from the right wall 78 provides a high speed flow of heated combustion products and air toward the left wall 77 at a level below the undersurface of the glass sheet. The set of burners disclosed in FIG. 5 provides a generally clockwise motion of fluid at a relatively high velocity across the depicted section of the furnace 70. Additional pairs of burners spaced lengthwise of the furnace provide alternate counterclockwise and clockwise high speed flows of gaseous products mixed with air within the furnace.

The speeds of fluid flow are sufficiently rapid to avoid the establishment of a stagnant layer of hot air at the major surfaces of the glass. The flow of combustion products hotter than the initial glass temperature helps raise the glass sheet temperature during the early stages of the heating cycle. The temperature of the flowing fluid in the later stages of the heating operation is below the temperature of the radiant heat sources. Thus, the maximum glass surface temperature attained during the heating cycle is controlled to be less than the surface temperature attained without the positive fluid flow.

The fluid flow raises the pressure within the furnace to above that of the surrounding atmosphere. This positive pressure reduces the tendency of random currents of cold air to enter the furnace and cool the glass locally, thereby stressing the sheet and causing the likelihood of breakage.

Referring now to FIGS. 6 and 7, a typical gas burner 80 supported within the opening in the furnace wall 77 will be described. The burner comprises a centrally disposed gas inlet chamber 82 communicating with a gas inlet housing 84 which is internally threaded to receive a gas supply pipe (not shown).

The gas inlet chamber 82 is of substantially cylindrical configuration and supplies gas axially inwardly into a cylindrically shaped mixing and combustion chamber 86. An air supply chamber 88 of substantially torus cross section is supplied air through an air supply housing that is internally threaded to receive an externally threaded nipple of an air supply pipe (not shown). The air supply chamber 88 completely surrounds the gas inlet chamber 82, and a cylindrically shaped wall 92 separates the gas inlet chamber 82 from the air supply chamber 88.

Circumferentially arranged ports 93 are disposed near the axially inner end of cylindrical wall 92 and extend tangentially of their point of entry. The gas supply chamber 82 has an exit port 92 communicating with the mixing and combustion chamber 86. The inner wall 95 of the air supply chamber 88 is pierced by circumferentially arranged air supply pipes 96 of cylindrical shape that communicate between the end of the air supply chamber 88 and the combustion and mixing chamber 86. Ports 93 permit some premixing of fluid between the air supply chamber 88 and the gas inlet chamber 82 before the main mixture takes place in the combustion and mixing chamber 86.

The end of the combustion and mixing chamber adjacent the inner side of wall 77 tapers in cross section to increase the velocity of the gaseous products imparted from the combustion and mixing chamber 86 into the furnace cavity. This construction accelerates the velocity of the combustion products to a velocity sufficient to provide gaseous movement completely across the furnace width.

The axis of each burner 80 extends transversely of the length of the furnace to enable the high velocity flow of combustion products and excess air to move in a direction transverse to the length of the furnace and parallel to a major surface of the glass sheet undergoing treatment.

The furnace 70 of the embodiment of FIGS. 4 and 5 is of the continuous type and extends from an entrance 98 to an exit 100. The conveyor rolls 72 traverse in succession a first preheat zone 102, a second preheat zone 104, and a bending zone 106 all disposed between the entrance 98 and the exit 100 of furnace 70. A tempering apparatus 108 located beyond the exit 100 is also traversed by the conveyor rolls 72.

The latter includes upper plenums 109 and lower plenums 110 having openings facing the surfaces of the bent glass sheets. Air under pressure is supplied through the plenums from a source (not shown) through flexible conduits 112 and the plenums 109 and 110 are moved orbitally in unison by a motion imparting mechanism 114 as is conventional in this art.

In a typical horizontal continuous system, the burners near the loading end (first preheat zone 102) of the furnace supplied 254 cubic feet of gas per hour which produced combustion products at a velocity of 135 feet per second at a temperature of 1300 degrees Fahrenheit as they left the burner. In the second preheat zone, 116 cubic feet of gas per hour was supplied to produce combustion products at a velocity of 77 feet per second at 775 degrees Fahrenheit at the exit of the burner, and a third set of burners in the bending zone near the exit of the furnace supplied 180 cubic feet of gas to produce combustion products at a velocity of 95 feet per second at 1100 degrees Fahrenheit at the burner exits. Each of these gases was mixed with sufficient air to obtain the temperature desired. Electrical power supplied to the system was 1103 kilowatts, of which 385 kilowatts was furnished in the first preheat zone, 284 kilowatts at the second preheat zone, and 434 kilowatts in the bending zone.

The first set of burners at the first preheat zone beyond the entrance increased the ambient temperature in the first preheat zone and increased the heating rate for the glass surface as well as the interior. At the second preheat zone, the heating rate at the surface was retarded to provide a tougher skin or surface of the glass, thus reducing the tendency for the glass sheet to be marked or deformed by the supporting mold.

At this stage of the bending cycle, the glass sheet interior became plastic enough to be shaped. After the glass completed its contact with the mold in the bending zone, the third set of burners nearest the exit provided a flow of hot gases sufficient to moderate the thermal differences along the length of the bent glass, particularly when the glass was exposed to a heating pattern of radiant heaters energized at sufficiently different radiant levels to cause intensely heated portions of the glass sheet transported laterally through the furnace to be bent relatively sharply while other portions simultaneously exposed to other heaters of less intensity were bent substantially lesser amounts.

Figure 9:
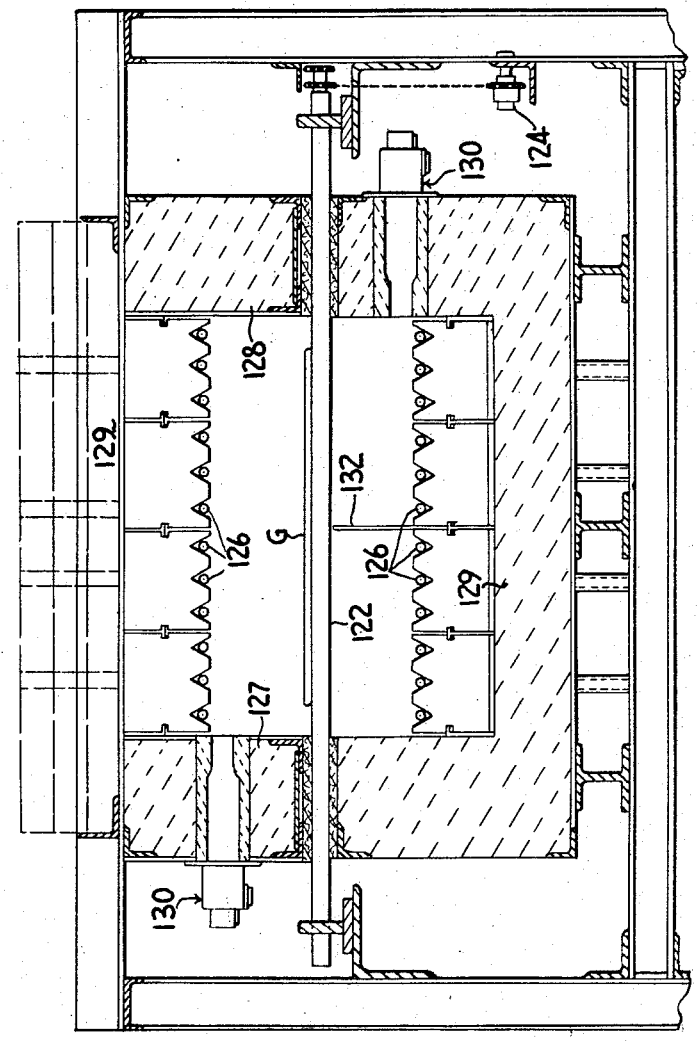
FIG. 9 is a cross-section of the furnace of FIG. 8.

The principles enunciated for the embodiment of FIGS. 4 to 7 can be applied equally usefully for roller hearth furnaces such as illustrated in FIGS. 8 and 9. Here, glass sheets G are conveyed while supported on rollers through a heating furnace. High velocity flows of hot gases across the upper and lower surfaces of the glass sheets improve the surface hardness and reduce the tendency of the hot glass sheets to be deformed as they contact successive, spaced rolls. Since the rollers are permanently installed in a furnace, their temperatures approach that of the ambient atmosphere and the glass sheets G are less likely to suffer damage from chill-cracking during their heating.

In the embodiment of FIGS. 8 and 9, a tunnel-like furnace 120 is traversed by a conveyor 121 comprising a series of transversely extending rollers 122 spaced longitudinally therealong. A drive motor 124 and suitable chain and sprocket drive means cause the rollers 122 to rotate and convey a plurality of glass sheets along the furnace. Heating elements 126 are supported by the upper and lower walls 129 of the furnace. The conveyor rolls 122 have their glass support surfaces located in a plane intermediate the upper and lower heaters.

The furnace has a left wall 127 and a right wall 128. Gas burners 130, similar to the burners 80 of the previous embodiment, are arranged in pairs, one above and one below the plane of the conveyor rolls 122. One burner of each pair extends in a substantially horizontal direction through wall 127 toward wall 128 for directing combustion products at high velocity toward wall 128, while the other burner of the pair extends in a substantially horizontal direction through wall 128 toward wall 127 for directing combustion products at high velocity toward wall 127. Alternate pairs of burners are disposed in alternate arrangements top to bottom through the respective walls to provide alternate clockwise and counterclockwise flows of combustion products across the path of movement of the glass sheets G through the furnace 120.

The furnace also includes a thermosensitive device 132 that senses the surface temperature of the glass sheets conveyed immediately adjacent thereto.

A filming station 140 comprising a battery of one or more spray guns 142 mounted for movement transverse to the longitudinal axis of the conveyor, such as depicted in U.S. Patent No. 2,899,929 to Monroe, is located beyond the exit of the furnace 120. The spray guns 142 are located above the conveyor path and oriented to impart a filming composition onto the upper surface of the glass sheets G transported along the conveyor rolls 122.

Additional glass treatment means, such as a tempering station (not shown) or an annealing lehr (also not shown), may be included beyond the filming station or substituted therefor, depending upon the fabrication operation that is to be performed on the glass sheets. Similarly, the earlier embodiments of furnaces may be employed for purposes other than those specifically illustrated. For example, the furnace of the embodiment of FIGS. 1 to 3 may also be employed with press bending apparatus or filming apparatus and the furnace of the embodiment of FIGS. 4 and 5 may be employed with coating apparatus, for example, in addition to or instead of the operation initially illustrated. This latter embodiment may be provided with radiant heaters in the top wall only and fluid supply means extending through the side walls of the heating furnace.

A common feature of the apparatus aspect of this invention is used in a tunnel-like furnace for heating a glass sheet having solid members contacting at least one major surface of the glass sheet. This feature consists essentially of providing means to heat fluid and means to direct the heated fluid under pressure within the furnace and along the entire major surface of the glass sheet while it is undergoing radiant heating so as to control the maximum surface temperature of the glass sheet to a temperature less than it would attain in the absence of said fluid directing means, while not affecting the interior temperature of the heated glass to an appreciable extent.

The form of the invention shown and described in this disclosure represents an illustrative preferred embodiment and certain modifications thereof. Each of the illustrative embodiments of furnace illustrated, vertical and horizontal, and glass support methods described, may be employed for tempering, filming, annealing, and other fabrication uses other than the specific fabrication technique described. It is understood that various changes may be made and that the present invention may be employed in other environments where heating of the glass is an important part of the operation without departing from the spirit of the invention as defined in the claimed subject matter which follows.

What is claimed is:

1. A method of heating a glass sheet to a temperature above its strain point and below its softening point comprising heating said sheet by radiant energy by exposing said sheet to a source of radiant energy radiating heat at an energy level at least at the glass softening point and having a large portion of its radiated energy in the wave band between about 2.5 microns and about 4 microns in wave length characterized by first applying across the surface of said sheet relatively hot fluid at an elevated temperature above the strain point of said glass during said exposure to said radiant energy and, then, before the glass surface becomes susceptible to deformation and while continuing said exposure to said radiant energy, applying to said glass surface relatively cold fluid at a temperature below said strain point at a rate and for a time sufficient to retard the heating rate of the glass surface until the cumulative effect of said fluid application makes the glass surface less susceptible to distortion than it would have been if said glass sheet were heated by radiation alone, and continuing said simultaneous exposure to radiant heat and said fluid until said glass sheet temperature is raised to a still higher temperature between said strain point and its softening point.

2. The method according to claim 1, wherein said additional fluid is applied at two temperatures, first at said temperature below said strain point and then at a temperature intermediate said first and second fluid temperatures.

3. The method according to claim 1, wherein said glass sheet is supported in bending relation to a shaping surface during said simultaneous exposure to said radiant energy and said fluid and is heated sufficiently to change its shape into one conforming to said shaping surface during said heating method.

4. The method according to claim 1, wherein said glass sheet is heated to a temperature sufficient for tempering by said simultaneous exposure to said radiant energy and said fluid, and when said glass sheet reaches said temperature sufficient for tempering, immediately chilling said glass sheet by discontinuing said radiant heating and applying relatively cold fluid against the surface of said glass sheet at a sufficiently rapid rate to temper said glass sheet.

5. The method according to claim 1, wherein said glass sheet is heated to a temperature above its annealing range by said simultaneous exposure to said radiant energy and said fluid, and is subsequently annealed by cooling said glass at a controlled rate of cooling through its annealing range.

6. The method according to claim 1, further including the step of applying a coating composition to said glass sheet wherein said glass sheet is heated during said simultaneous exposure to said radiant heating and said fluid to a temperature sufficient for said coating composition to become permanently fixed to said glass sheet.

References Cited by the Examiner

UNITED STATES PATENTS

| | | | |
|---|---|---|---|
| 2,068,799 | 1/1937 | Guyer | 65—115 |
| 2,831,780 | 4/1958 | Deyrup | 65—62 |
| 2,924,695 | 2/1960 | Atkeson | 65—114 |
| 3,062,520 | 11/1962 | Frey et al. | 263—8 |

DONALL H. SYLVESTER, *Primary Examiner.*

A. D. KELLOGG, *Assistant Examiner.*